US008073617B2

(12) United States Patent
Nakamura

(10) Patent No.: US 8,073,617 B2
(45) Date of Patent: Dec. 6, 2011

(54) MAP INFORMATION GENERATING SYSTEMS, METHODS, AND PROGRAMS

(75) Inventor: Norihiro Nakamura, Toyokawa (JP)

(73) Assignee: Aisin AW Co., Ltd., Anjo (JP)

( * ) Notice: Subject to any disclaimer, the term of this patent is extended or adjusted under 35 U.S.C. 154(b) by 916 days.

(21) Appl. No.: 12/003,024

(22) Filed: Dec. 19, 2007

(65) Prior Publication Data

US 2008/0162041 A1   Jul. 3, 2008

(30) Foreign Application Priority Data

Dec. 27, 2006  (JP) ................. 2006-352908
Dec. 27, 2006  (JP) ................. 2006-352922
Dec. 27, 2006  (JP) ................. 2006-352951
Dec. 27, 2006  (JP) ................. 2006-353057

(51) Int. Cl.
G01C 21/26   (2006.01)
(52) U.S. Cl. ............... 701/209; 701/208; 701/210
(58) Field of Classification Search .......... 701/200, 701/207–213; 340/988–992, 995.1–995.16
See application file for complete search history.

(56) References Cited

U.S. PATENT DOCUMENTS

| 6,154,152 | A | 11/2000 | Ito |
| 6,516,267 | B1 * | 2/2003 | Cherveny et al. ............. 701/208 |
| 6,546,334 | B1 * | 4/2003 | Fukuchi et al. ............... 701/208 |
| 6,640,187 | B1 * | 10/2003 | Chenault et al. ............. 701/209 |
| 2003/0125871 | A1 | 7/2003 | Cherveny et al. |
| 2006/0155464 | A1 | 7/2006 | Smartt |

FOREIGN PATENT DOCUMENTS

| DE | 100 30 932 A1 | 1/2002 |
| EP | 1 530 025 A2 | 5/2005 |
| JP | A-09-243391 | 9/1997 |
| JP | A-11-119647 | 4/1999 |
| JP | A-2002-054934 | 2/2002 |
| JP | A-2003-345237 | 12/2003 |
| JP | A 2004-251790 | 9/2004 |
| JP | A-2004-286641 | 10/2004 |
| JP | A-2005-172578 | 6/2005 |
| JP | A-2005-221419 | 8/2005 |
| JP | A-2006-170970 | 6/2006 |

OTHER PUBLICATIONS

Japanese Patent Office, Notification of Reason(s) for Refusal mailed May 31, 2011 in Japanese Patent Application No. 2006-352951 w/Partial English-language Translation.
Japanese Patent Office, Notification of Reason(s) for Refusal mailed May 31, 2011 in Japanese Patent Application No. 2006-352908 w/Partial English-language Translation.
Japanese Patent Office, Notification of Reason(s) for Refusal mailed Jun. 28, 2011 in Japanese Patent Application No. 2006-353057 w/Partial English-language Translation.

* cited by examiner

Primary Examiner — Richard M. Camby
(74) Attorney, Agent, or Firm — Oliff & Berridge, PLC

(57) ABSTRACT

Systems, methods, and programs store map information including a road network. The systems, methods, and programs gather traveling information including a plurality of loci, each locus representing a vehicle traveling along a road that is not included in the stored road network. The systems, methods, and programs separate the loci within the gathered traveling information into groups, each group related to a same road and generate new road information relating to a single new road for each group of loci.

15 Claims, 15 Drawing Sheets

FIG. 3

START LINK No. L$_S$

| TIME t | COORDINATES P (x, y) | | ADVANCEMENT DIRECTION N | VEHICLE SPEED S |
|---|---|---|---|---|
| t$_S$ | x$_S$ | y$_S$ | N$_S$ | S$_S$ |
| t$_1$ | x$_1$ | y$_1$ | N$_1$ | S$_1$ |
| t$_2$ | x$_2$ | y$_2$ | N$_2$ | S$_2$ |
| t$_3$ | x$_3$ | y$_3$ | N$_3$ | S$_3$ |
| . | . | . | . | . |
| . | . | . | . | . |
| . | . | . | . | . |
| t$_E$ | x$_E$ | y$_E$ | N$_E$ | S$_E$ |

END LINK No. L$_E$

24

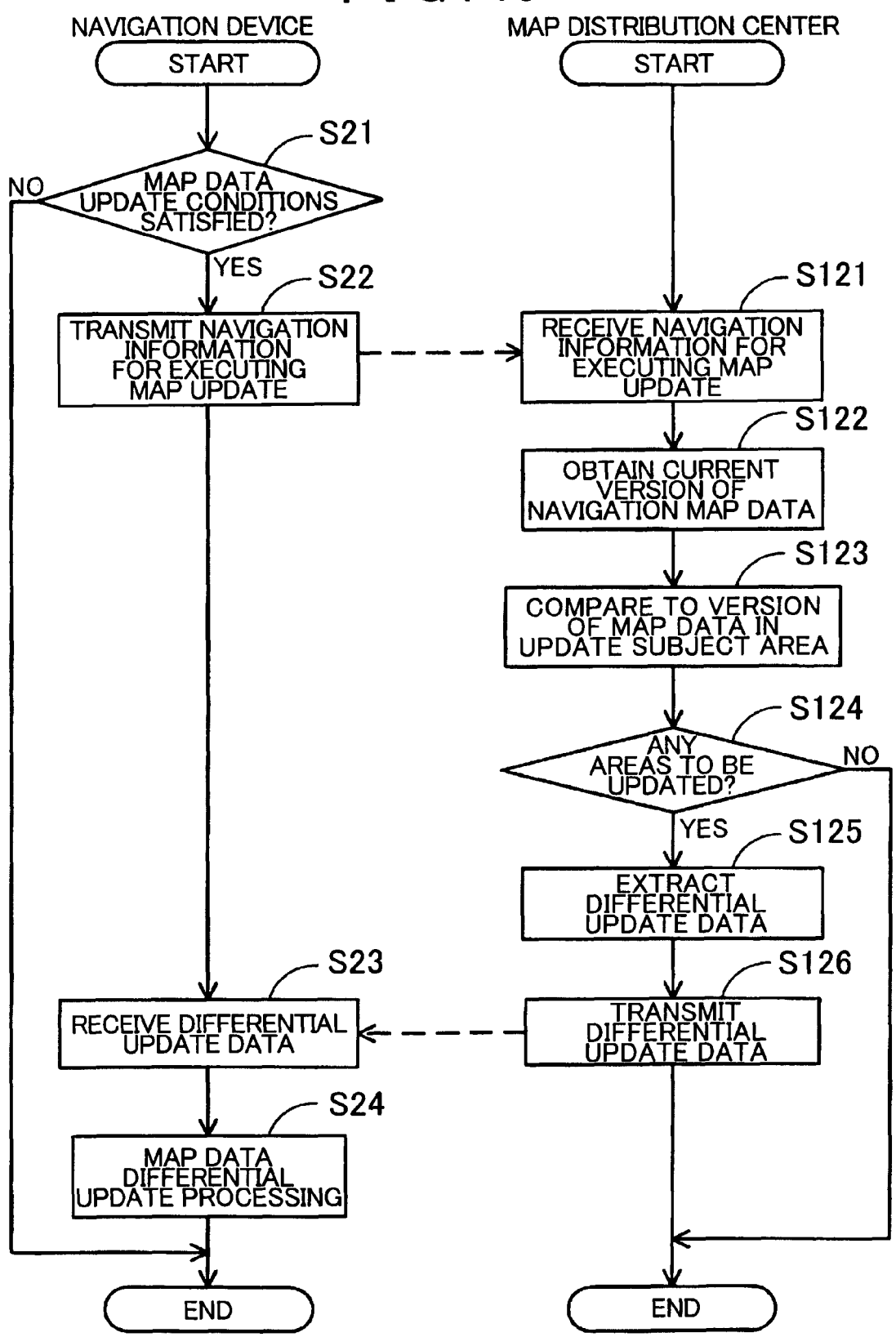

MAP INFORMATION GENERATING SYSTEMS, METHODS, AND PROGRAMS

INCORPORATION BY REFERENCE

The disclosures of Japanese Patent Application No. 2006-352951, filed on Dec. 27, 2006, Japanese Patent Application No. 2006-353057, filed on Dec. 27, 2006, Japanese Patent Application No. 2006-352922, filed on Dec. 27, 2006, and Japanese Patent Application No. 2006-352908, filed on Dec. 27, 2006, including the specifications, drawings and abstracts are incorporated herein by reference in their entirety.

BACKGROUND

1. Related Technical Fields

Related technical fields include map information generating systems. In particular, related technical fields include systems for generating new road information that is added to map information stored in a navigation device or the like.

2. Related Art

Navigation devices provide guidance for vehicles, enabling a driver to reach a desired destination easily. Such devices are capable of detecting the current position of a vehicle using a GPS receiver, obtaining map data corresponding to the current position from a recording medium, or through a network, and displaying the obtained map data on a display. On the basis of the map data, a map image showing the area around the current position of the vehicle displayed on the display, and a vehicle position mark (location) is superposed on the map image. By scrolling the map image in accordance with movement of the vehicle or moving the vehicle position mark while the map image is fixed on the screen, the current geographical location of the vehicle can be learned at a glance.

New roads are constructed every year. At the same time, existing roads are destroyed and modified. In this case, a problem arises in that information relating to new roads constructed after the map data of the navigation device have been generated is not recorded in the map information data. In other words, the navigation device finds recommended routes that do not pass along the new roads or include destroyed roads. To avoid this problem, the map data stored in the navigation device must be updated at intervals of a certain time period. Such updating is performed by purchasing a new DVD and replacing the old DVD with the new DVD, or overwriting the content of the HDD on the basis of update map data distributed from a map information distribution center.

New road information is typically generated on the basis of survey data obtained when a person actually surveys the new road on site. However, an extremely large number of new roads are built every year, and therefore a huge amount of time is required to survey all of the necessary items in such a manner. As a result, a considerable amount of time is required before new roads are reflected in the map data of the navigation device, leading to a reduction in the reliability of the navigation device. Hence, attempts have been made to generate new road information using a vehicle traveling history. For example, Japanese Patent Application Publication 2004-251790 (e.g., page 8 to page 9, FIG. 4) describes a map information updating system for updating map data by generating new road information automatically on the basis of traveling locus data of a vehicle when it is determined that the vehicle has been traveling continuously along a road that does not exist in the map data of the navigation device.

SUMMARY

In the map information updating system described in Japanese Patent Application Publication 2004-251790, map matching is performed, and whenever it is determined that the vehicle has been traveling continuously along a road that does not exist in the map data of the navigation device, new road information based on the traveling locus is generated without exception. Accordingly, new road information relating to the same new road may be generated more than once. More specifically, even when the vehicle travels along the same road a number of times, it is unlikely that the traveling loci will match completely, especially when the road has a plurality of lanes. Moreover, deviations may occur among traveling loci due to detection errors. Hence, new road information is generated every time the vehicle travels along the new road, and as a result, plural new road information relating to a single road is added to the map data.

Exemplary implementations of the broad principles described herein provide a map information generating system that may prevent the generation of plural new road information in relation to a single road when the new road information is generated from the traveling locus of a vehicle.

Exemplary implementations provide systems, methods, and programs that store map information including a road network. The systems, methods, and programs gather traveling information including a plurality of loci, each locus representing a vehicle traveling along a road that is not included in the stored road network. The systems, methods, and programs separate the loci within the gathered traveling information into groups, each group related to a same road and generate new road information relating to a single new road for each group of loci.

BRIEF DESCRIPTION OF THE DRAWINGS

Exemplary implementations will now be described with reference to the accompanying drawings, wherein:

FIG. 3 is a view showing an example of a storage area in a traveling locus information DB;

FIG. 15 is a flowchart of an exemplary map data update processing method.

DETAILED DESCRIPTION OF EXEMPLARY IMPLEMENTATIONS

Figure 1:
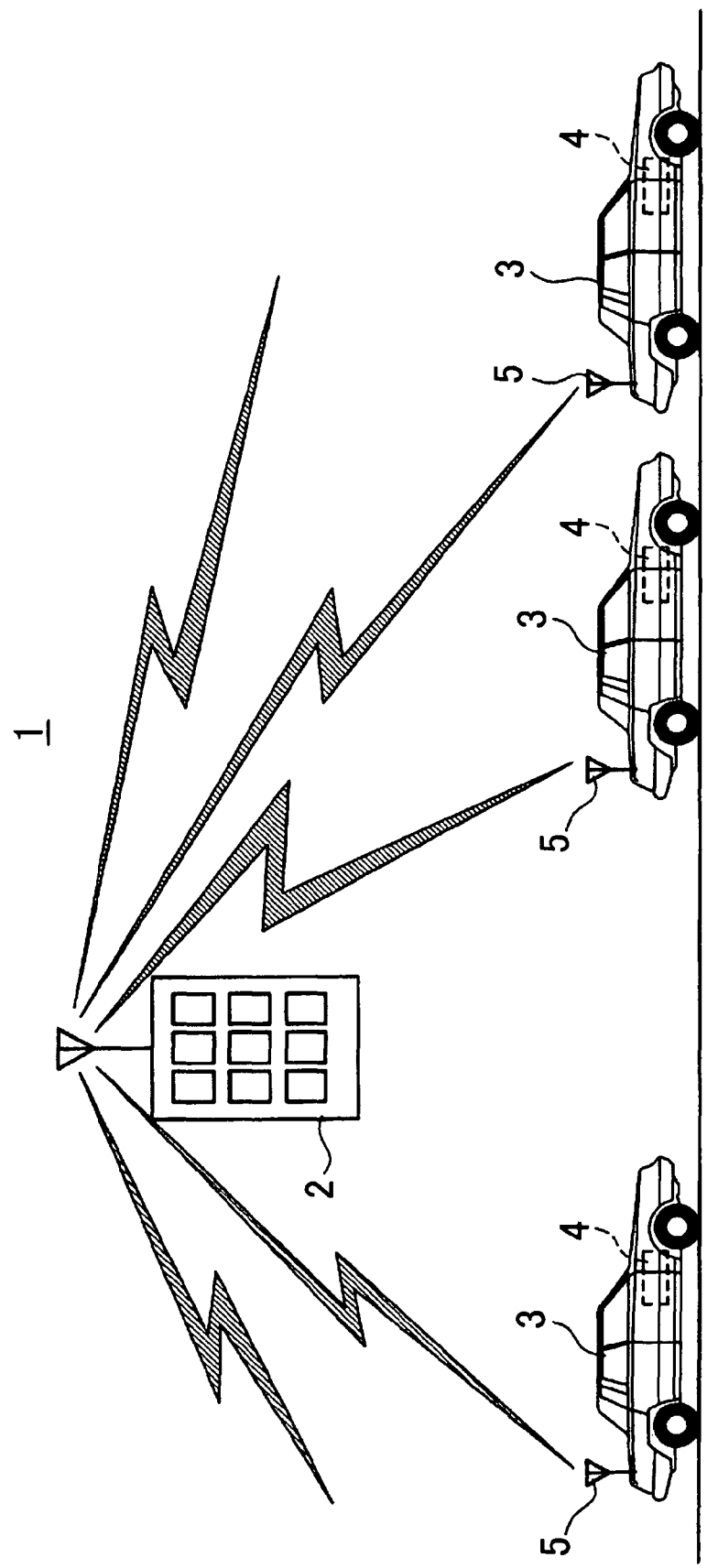
FIG. 1 is a schematic view showing an exemplary map information generating system.

FIG. 1 is a schematic view showing an exemplary map information generating system 1. As shown in FIG. 1, the map information generating system 1 may physically, functionally, and/or conceptually, include a map distribution center 2, vehicles 3 serving as probe cars, and a navigation device 4 installed in each vehicle 3.

Here, the map distribution center 2 may gather and accumulate traveling locus information in the form of probe data transmitted from each of the vehicles 3 as they travel throughout the country. The map distribution center may generate new road information from the accumulated traveling locus information. The map distribution center 2 may refer to the generated new road information to generate update data for updating an old version of map data to a new version of the map data including the newly constructed new roads, and may distribute the generated update data.

Note that two types of update data may be used, namely full update data for overwriting and updating all of the map data stored in the navigation device 4 (to be referred to hereafter as a full update), and differential update data for overwriting and updating only a specific area of the map data (to be referred to here after as a differential update). In the examples described below, differential update data is used as update data.

The vehicles 3 travel along various roads throughout the country, and may serve as probe cars constituting a probe car system together with the map distribution center 2. Here, the probe car system is a system for gathering information using vehicles as sensors. Specifically, the vehicle 3 may transmit various system operating condition data, such as speed data, steering operation data, and shift position data, together with GPS position information to the map distribution center using a communication module 5. On the map distribution center side, the gathered data may be reused as various types of information.

The probe data obtained by the vehicle 3 and transmitted to the map distribution center 2 may specifically include the positional coordinates (latitude and longitude), bearing, and speed of the vehicle 3 when the vehicle 3 travels along a road that is not included in navigation map data 53 (see FIG. 5) provided in the navigation device 4. In other words, traveling locus information relating to the traveling locus of the vehicle 3 when the vehicle 3 travels along a road that is not included in the navigation map data 53 may be obtained and transmitted as the probe data. Note that only one of the vehicles 3, rather than a plurality, needs to be capable of communicating with the map distribution center 2. In this case, the navigation map data 53 may be updated on the basis of the traveling locus of that vehicle alone, and the traveling loci of the other vehicles may not be taken into account.

The navigation device 4 may be an on-vehicle device disposed in the vehicle 3 for displaying a map of the area around an associated vehicle's position on the basis of the stored map data, and performing a route search and route guidance to a set destination. Here, the map distribution center 2 and the navigation device 4 are constituted to be capable of two-way communication using a DCM installed in the vehicle in advance or a vehicle communication module 5 (to be referred to simply as the communication module 5 hereafter) such as a cellular telephone. Thus, various types of information, such as differential update data and the traveling locus information serving as the probe data, may be transmitted and received between the map distribution center 2 and the navigation device 4.

When the differential update data is transmitted to the navigation device 4 from the map distribution center 2, the navigation device 4 may update the stored map data on the basis of the transmitted differential update data.

Note that in the map information generating system 1 according to this example (to be described below) the navigation device 4 performs a map update by obtaining the differential update data directly from the map distribution center 2. However, a map update may be performed through a user PC (Personal Computer) possessed by a user or a distribution outlet such as a dealer.

For example, when a map update is performed through a user PC, the differential update data may be downloaded from the map distribution center 2 on the user PC, which is constituted to be capable of communicating with the map distribution center 2 through a communication network such as the Internet. The downloaded differential update data may be stored temporarily on an HDD (Hard Disk Drive), whereupon the stored data are recorded on a medium such as a CD-R or a DVD-R and read by the navigation device 4. Thus, the differential update data can be transferred to the navigation device 4.

On the other hand, when a map update is performed through a distribution outlet, the full update data may be downloaded to a distribution outlet PC disposed in the distribution outlet via a satellite communication network or the like. Moreover, the distribution outlet may be capable of detaching a distribution outlet HDD that serves as a storage medium connected to the distribution outlet PC. By newly connecting the detached distribution outlet HDD to the navigation device 4 in accordance with the IEEE1394 (Institute of Electrical and Electronic Engineers 1394) standard or the like, the full update data can be transferred to the navigation device 4.

Figure 2:
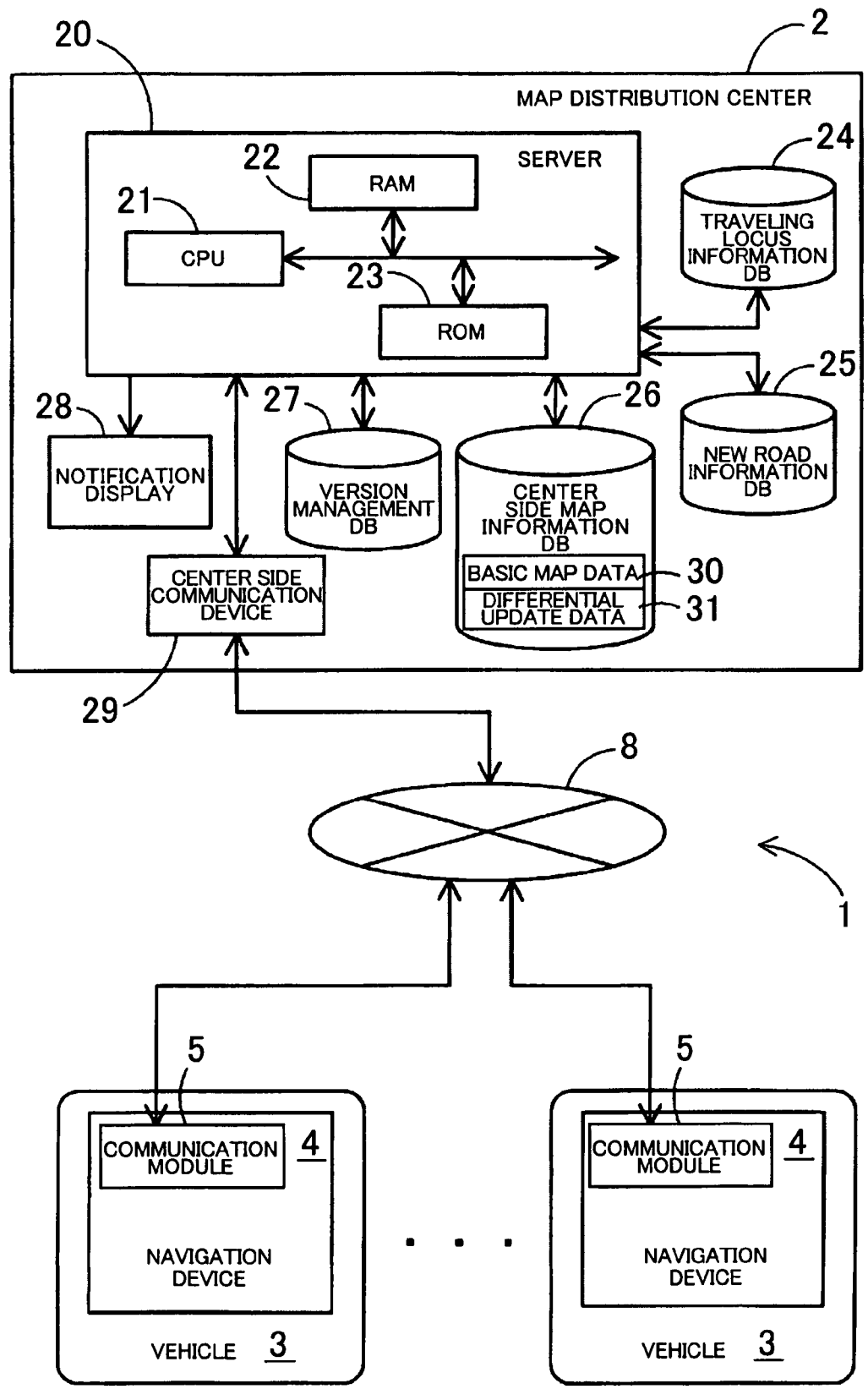
FIG. 2 is a block diagram showing an exemplary structure of the map information generating system.

Next, the map distribution center 2 of the map information generating system 1 will be described in detail using FIG. 2. FIG. 2 is a block diagram showing an exemplary structure of the map information generating system 1. As shown in FIG. 2, the map distribution center 2 may include a controller (i.e., server 20), a traveling locus information DB 24 connected to the server 20, a new road information DB 25, a center side map information DB 26, a version management DB 27, a notification display 28, and a center side communication device 29.

The server 20 may be provided with a CPU 21 serving as a calculation device and a control device for performing overall control of the server 20, and internal storage devices such as RAM 22, which is used as working memory when the CPU 21 performs various calculation processing, and ROM 23, which is recorded with various control programs. The control programs may include a program for performing unsuitable information exclusion processing for excluding unsuitable information from the traveling locus information serving as the probe data gathered from the vehicles 3, a program for performing information grouping processing for grouping the traveling locus information that has not been excluded into traveling locus information relating to the same road, a program for new road information generation processing for generating new road information relating to a single new road in each group on the basis of the grouped traveling locus information, a program for priority sequence setting processing for setting a priority sequence in relation to the generated new road information on the basis of the number of times the vehicle travels along the new road, a program for new road information notification processing for displaying the new road information on the notification display 28 in accordance with the set priority sequence, a program for update data generation processing for generating differential update data including new road information that is not included in the road network of the old version of the map data on the basis of the old version of the map data and the new version of the map data, a program for map data distribution processing for distributing the generated differential update data to the navigation device 4 that has requested the differential update data, and so on. Note that an MPU or the like may be used instead of the CPU 21.

The traveling locus information DB 24 may serve as a storage portion for cumulatively storing traveling locus information relating to vehicle traveling loci gathered from the vehicles 3 that travel throughout the country. The traveling locus information stored in the traveling locus information DB 24 may be traveling locus information relating to a traveling locus when the vehicle 3 travels along a road that is not included in the road network of the navigation map data in the navigation device 4.

The traveling locus information stored in the traveling locus information DB 24 will now be described in detail using FIG. 3. FIG. 3 is a view showing an example of a storage area of the traveling locus information DB 24. As shown in FIG. 3, the traveling locus information may include a start link number $L_S$, which is a link number relating to a road link (to be referred to hereafter as a start link) of a traveling locus start point (a point S in FIG. 8) at which the vehicle begins to travel toward a road not included in the road network of the navigation map data from an existing road link included in the navigation map data. The traveling locus information may include an end link number $L_E$, which is a link number relating to a road link (to be referred to hereafter as an end link) of a traveling locus end point (a point E in FIG. 8) at which the vehicle returns to an existing road link included in the navigation map data from a road not included in the road network of the navigation map data, and a time t, positional coordinates P (x, y), an advancement direction N, and a vehicle speed S obtained at predetermined time intervals (of one second, for example) while the vehicle 3 travels along a road not included in the map data.

This traveling locus information may be stored in the traveling locus information DB 24 cumulatively in accordance with the number of times the information is gathered from the vehicles 3.

The new road information DB 25 serves as a storage portion for storing new road information relating to a new road, which is generated by grouping the plurality of traveling locus information stored in the traveling locus information DB 24 into groups of traveling locus information relating to the same road, as will be described below. The new road information stored in the new road information DB 25 may be information relating to a new road, which is generated on the basis of traveling locus information that has been divided into traveling locus information relating to the traveling locus of a single new road by subjecting the traveling locus information gathered from the vehicles 3 to unsuitable information exclusion processing (e.g., S12 in FIG. 9) and information grouping processing (e.g., S13 in FIG. 9), which will be described below. The new road information DB 25 may also store information relating to a priority sequence for providing notification on the notification display 28 and performing distribution to the navigation device 4, which is set through priority sequence setting processing (e.g., S16 in FIG. 9) which will also be described below.

Figure 4:
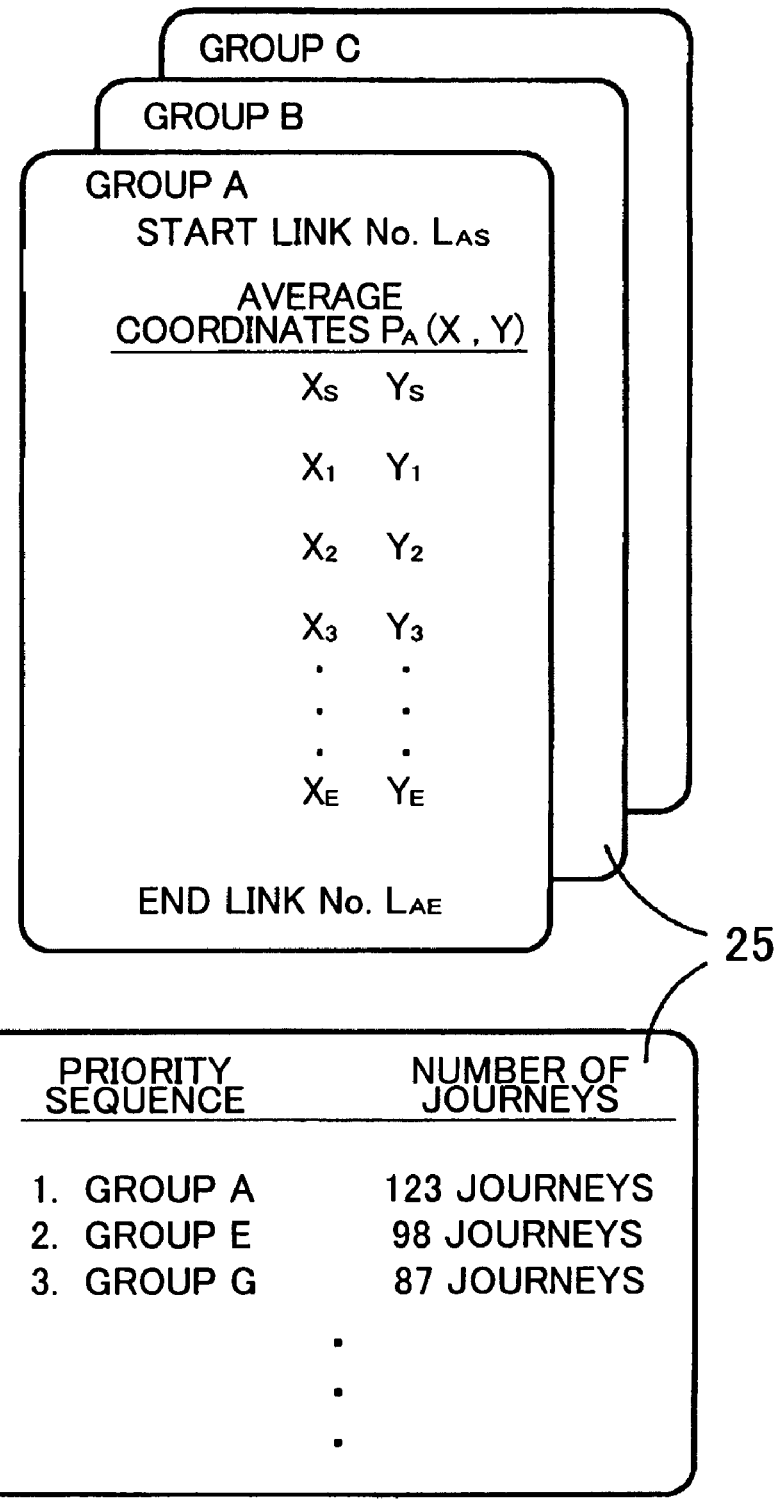
FIG. 4 is a view showing an example of a storage area in a new road information DB.

The new road information stored in the new road information DB 25 will now be described in detail using FIG. 4. FIG. 4 is a view showing an example of a storage area of the new road information DB 25. Specifically, as shown in FIG. 4, the new road information may be constituted by a start link number $L_{AS}$ of an existing road link including the start point of a traveling locus belonging to each group, an end link number $L_{AE}$ of the existing road link including the end point of the traveling locus, and average positional coordinates $P_A(X, Y)$ taken at predetermined distance intervals (of 10 m, for example) from the start point of the traveling locus belonging to the group. Therefore, a new road specified by the new road information shown in FIG. 4 starts from the existing road link having the link number $L_{AS}$, passes through the positional coordinates $P_A(X, Y)$, and extends to the road link having the link number $L_{AE}$.

Basic map data 30, which is map data generated on the basis of input data or an input operation from the outside and serves as a basis for updating the navigation map data stored in the navigation device 4, is stored in different versions in the center side map information DB 26. Here, a version is creation time information for specifying the creation time of the map data. By referencing the version, it is possible to specify the time at which the map data was created. Differential update data 31, which is generated by the server 20 on the basis of the basic map data 30 for differentially updating a part of the map data stored in the navigation device 4 to a new version of the map data, is also stored in the center side map information DB 26 in each version.

The version management DB 27 stores information relating to the version of the navigation map data stored in each navigation device 4. Here, the navigation map data and the basic map data 30 may include a road network and various types of information required for route guidance and map display, and include map display data for displaying a map, intersection data relating to intersections, node data relating to node points, link data relating to roads (links), search data for finding a route, facility data relating to facilities, search data for finding a geographical location, and so on.

As used herein, the term "link" refers to, for example, a road or portion of a road. For example, according to one type of road data, each road may consist of a plurality of compo-nential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

The notification display 28 serves as a notification portion for notifying the map distribution center 2 side of the generated new road information. Specifically, new road notification may be performed by displaying the new road and a peripheral map thereof, and displaying a map on which the new road is emphasized over other roads (see FIG. 14). The displayed map may be referenced in the map distribution center 2, whereupon the new road is subjected to an actual on-site inspection and a new version of the basic map data 30 including the new road is generated. Note that new road information notification is performed by the notification display 28 in accordance with the priority sequence set in the priority sequence setting processing (e.g., S16 in FIG. 9).

The center side communication device 29 serves as a communication device for communicating with the navigation device 4 via a network 8. Here, a communication system such as a LAN (Local Area Network), a WAN (Wide Area Network, an intranet, a cellular telephone network, a telephone network, a public communication network, a private communication network, the Internet, or another communication network, may be used as the network 8. Further, a communication network employing CS broadcasting, BS broadcasting, ground wave digital television broadcasting, FM multiplex broadcasting, and so on may be used. A communication system such as an electric toll collection system (ETC) in an intelligent transport system (ITS), dedicated short-range communication (DSRC) and so on may also be used.

Figure 5:
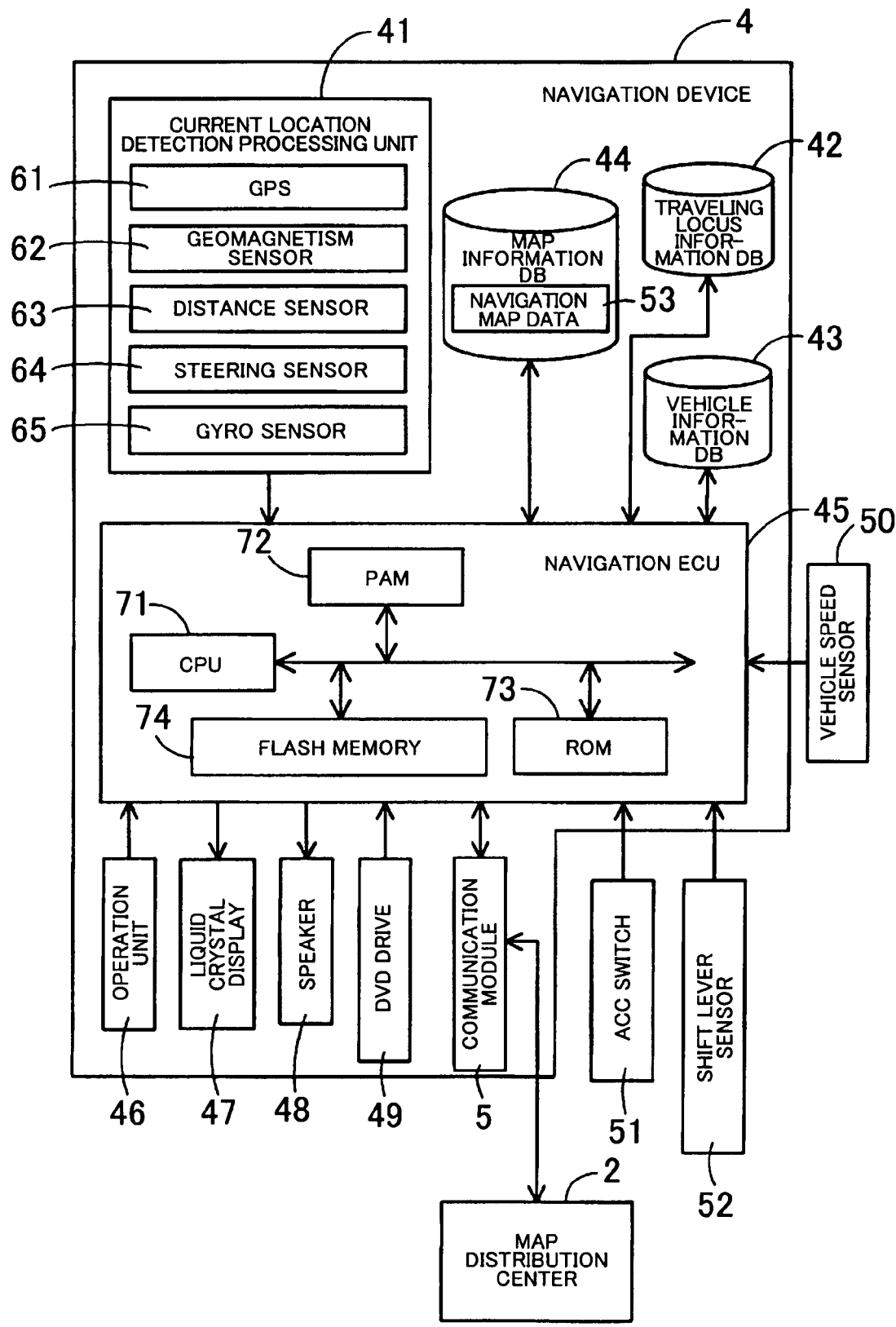
FIG. 5 is a block diagram showing the structure of an exemplary navigation device.

Next, a constitution of the navigation device 4 of the map information generating system 1 according to this example will be described using FIG. 5. FIG. 5 is a block diagram showing the constitution of an exemplary navigation device 4. As shown in FIG. 5, the navigation device 4 may physically, functionally, or conceptually include a current location detection processing unit 41 for detecting the current position of the associated vehicle, a traveling locus information DB 42, a vehicle information DB 43, a map information DB 44, a controller (e.g., navigation ECU 45) for performing various calculation processing on the basis of input information, an operation unit 46 for receiving an operation from an operator, a liquid crystal display 47 for displaying information such as a map to the operator, a speaker 48 for outputting voice guidance relating to route guidance, a DVD drive 49 serving as a reading device capable of reading a recording medium such as a CD or a DVD, and a communication module 5 for performing communication with a traffic information center, such as a VICS® center, and the map distribution center 2. A vehicle speed sensor 50 for detecting the traveling speed of the associated vehicle, an ACC switch 51 for detecting whether an ACC (accessory key) is ON or OFF (in other words, whether an engine is activated or stopped), and a shift lever sensor 52 for detecting the position of a shift lever, may be connected to the navigation ECU 45.

The current location detection processing unit 41 may include a GPS 61, a geomagnetism sensor 62, a distance sensor 63, a steering sensor 64, a gyro sensor 65 serving as a bearing detection unit, an altimeter (not shown), and so on, and is capable of detecting the current position of the associated vehicle, the bearing of the associated vehicle, the distance from the associated vehicle to a target (an intersection, for example), and so on.

The traveling locus information DB 42 serves as a storage portion for temporarily storing traveling locus information relating to a traveling locus generated when the associated vehicle travels along a road that is not included in the road network of the navigation map data 53 stored in the map information DB 44. Specifically, the start link number $L_S$, the end link number $L_E$, the time t, positional coordinates P (x, y), advancement direction N, and vehicle speed S obtained at predetermined time intervals (of one second, for example) while the associated vehicle travels along a road not included in the map data, as described above in FIG. 3, are detected by the GPS 61 and gyro sensor 65, and may be stored in sequence in the traveling locus information DB 42. The traveling history information stored in the traveling locus information DB 42 may then be transmitted at a predetermined timing to the map distribution center 2 as probe data. Every time the traveling locus information is transmitted, it may be deleted from the traveling locus information DB 42.

The vehicle information DB 43 serves as a storage portion storing information relating to the vehicle 3 in which the navigation device 4 is disposed, i.e., the associated vehicle. Information relating to the associated vehicle, such as the vehicle type (standard size, medium size, large size, oversized, minicar, and so on) and the vehicle width, for example, may be stored.

The map information DB 44 stores the navigation map data 53, which is used by the navigation device 4 for traveling guidance and route searches. Note that in this example, a hard disk is used as an external storage device and a storage medium for the traveling locus information DB 42, vehicle information DB 43, and map information DB 44, but instead of a hard disk, a magnetic disc such as a flexible disk may be used as the external storage device. Further, a memory card, magnetic tape, a magnetic drum, a CD, an MD, a DVD, an optical disc, an MO, an IC card, an optical card, and so on may be used as the external storage device.

Here, the navigation map data 53 may include various types of information required for route guidance and map display, similarly to the basic map data 30 described above, and may be constituted by map display data for displaying a map, intersection data relating to intersections, node data relating to node points, link data relating to roads (links), search data for finding a route, facility data relating to facilities, search data for finding a geographical location, and so on.

The navigation map data 53 may be updated by either a full update, in which the map data for all areas of the entire country are updated together, or a differential update, in which only the map data for a specific area are updated. Note that specific update processing methods relating to the full update and the differential update are already well-known techniques, and therefore description thereof has been omitted.

The navigation ECU 45 of the navigation device 4 is provided with a CPU 71 serving as a calculation device and a control device for performing overall control of the navigation device 4, and internal storage devices such as RAM 72, which is used as working memory when the CPU 71 performs various calculation processing and stores route data obtained during route searches and so on, and ROM 73. The ROM 73 may include various programs such as a control program, a probe data gathering processing program (e.g., FIG. 7) for obtaining traveling locus information when the vehicle 3 travels along a road that is not included in the road network of the navigation map data 53 and transmitting the traveling locus information to the map distribution center 2 as probe data, a route search processing program for performing a route search and route guidance on the basis of the navigation map data 53, a map data update processing program (e.g., FIG. 15) for performing a differential update on the navigation map data 53 on the basis of differential update data, and so on. The ECU 45 may include a flash memory 74 for recording programs read from the ROM 73. Note that semiconductor memory, a magnetic core and so on are used as the RAM 72, ROM 73, flash memory 74, and so on. Also, an MPU or the like may be used instead of the CPU 71 as the calculation device and control device.

Figure 6:
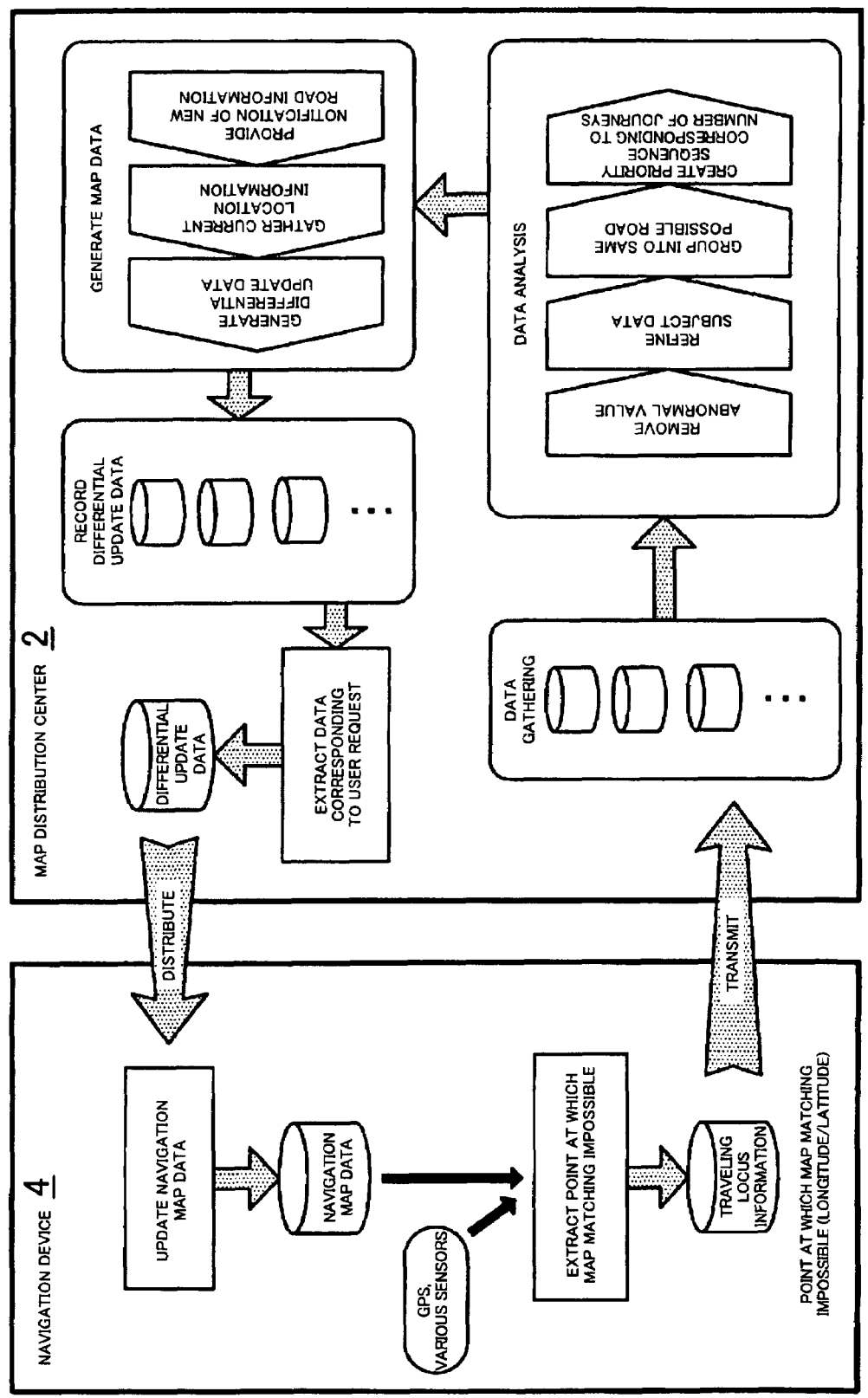
FIG. 6 shows an information flow of an exemplary map information generating method.

Next, a basic flow of information within the map information generating system 1 constituted as described above will be described using FIG. 6. FIG. 6 is an illustrative view showing an exemplary flow of the map information generating system 1.

First, as shown in FIG. 6, the navigation device 4 performs map matching on the basis of the navigation map data 53 stored in the map information DB 44 and the detection results of various sensors such as the GPS 61, and detects the positional coordinates (latitude and longitude) of the associated vehicle 3 and so on when a matching point cannot be extracted (in other words, when the associated vehicle 3 is traveling along a road that is not included in the navigation map data 53 provided in the navigation device 4). The navigation device 4 then transmits the detected positional coordinates and so on to the map distribution center 2 as traveling locus information.

Having received traveling locus information from the navigation device 4 in each vehicle 3, the map distribution center 2 gathers the received data together and performs data analysis. In this data analysis, first, detected abnormal values caused by device errors and so on may be removed. Next, traveling locus information assumed to have been obtained when the vehicle 3 was not traveling along a new road may be excluded in order to refine the subject data. Next, traveling locus information relating to the same road is grouped together, and new road information relating to a single new road belonging to the group is generated in each group. Further, a priority sequence may be set on the basis of the number of times the vehicle travels along the new road of the generated new road information.

Next, the map distribution center 2 generates map data on the basis of the new road information having the set priority sequence. To generate the map data, first the new road information is displayed on the notification display 28 in accordance with the set priority sequence, whereby the map distribution center 2 side is notified of the new road information. An operator of the map distribution center 2 then refers to the displayed new road information and gathers information relating to the new road by actually traveling to the site of the new road. Then, on the basis of the new road information displayed on the notification display 28 and the information gathered on site, a new version of the differential update data including the new road is created. The differential update data is then distributed to any navigation device that has requested a version update in accordance with the priority sequence set in relation to the new road information.

Having received the differential update data, the navigation device 4 updates the navigation map data 53 stored in the map information DB 44 to the new version of the map data including the new road. Then, on the basis of the updated navigation map data 53, the navigation device 4 performs map matching again. Thereafter, new road information generation and differential update data distribution are performed repeatedly in a similar manner.

Next, an exemplary probe data gathering method will be described with reference to FIG. 7. The exemplary method may be implemented, for example, by one or more components of the above-described system 1. However, even though the exemplary structure of the above-described system may be referenced in the description, it should be appreciated that the structure is exemplary and the exemplary method need not be limited by any of the above-described exemplary structure. For example, the probe data method may be implemented as a probe data gathering processing program executed by the navigation ECU 45 of the vehicle 3 and the server 20 of the map distribution center 2.

In the probe data gathering processing program, traveling locus information are obtained when the vehicle 3 travels along a road that is not included in the road network of the navigation map data 53 in the navigation device 4. The traveling locus information is transmitted to the map distribution center 2 as probe data, and the map distribution center 2 gathers together the traveling locus information transmitted from each vehicle 3. Note that when the method illustrated in the flowchart of FIG. 7 is implemented as a program, it may be stored in the RAM 72 or ROM 73 of the navigation device 4 or the RAM 22 or ROM 23 of the server 20 and may be executed by the CPU 71 or the CPU 21 at predetermined intervals (of 200 ms, for example).

Figure 7:
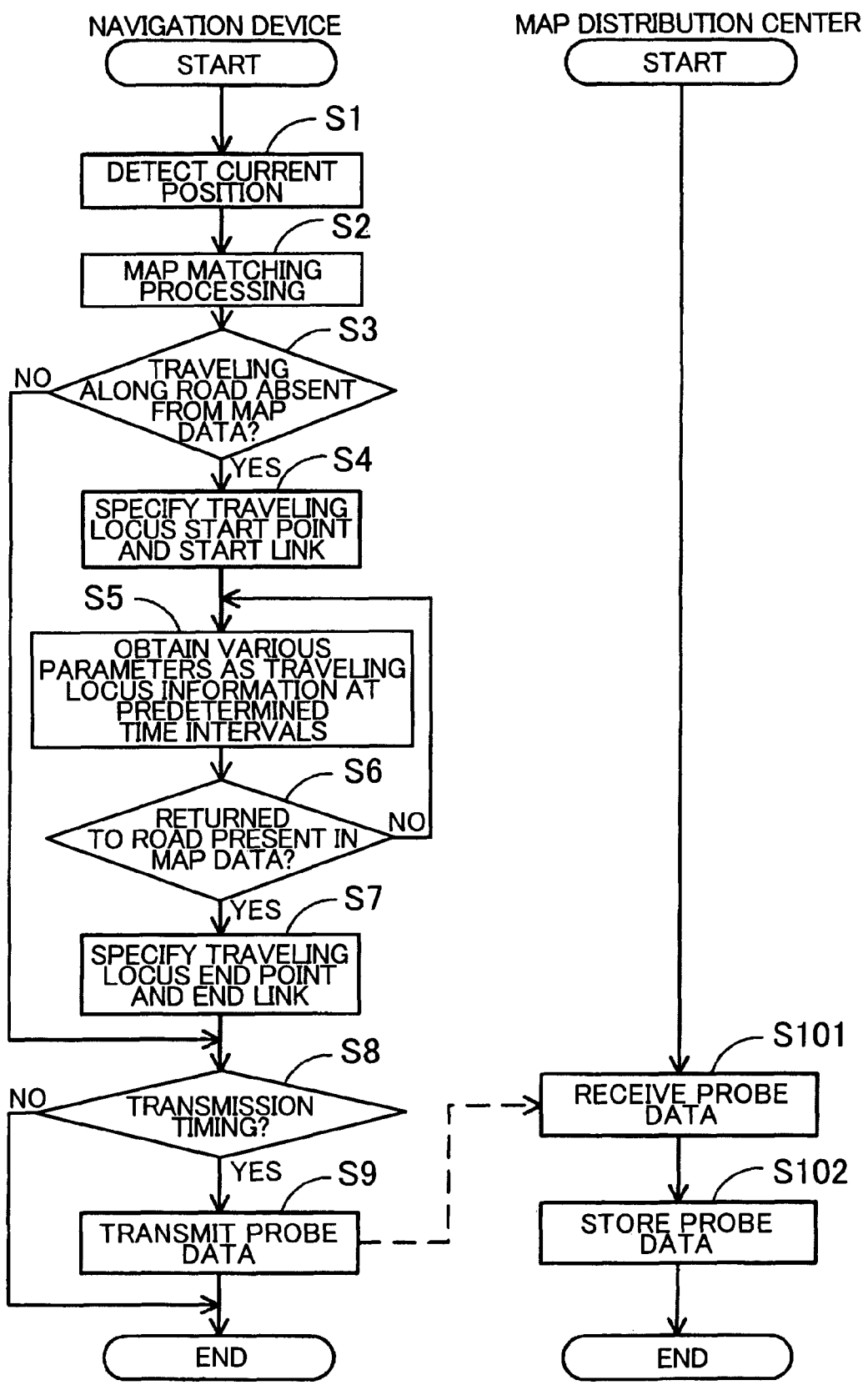
FIG. 7 is a flowchart of an exemplary probe data gathering method.

First, on the side of the navigation device 4, on the basis of FIG. 7, in step (to be abbreviated to S hereafter) 1, the CPU 71 detects the current position of the associated vehicle using the GPS 61. Next in S2, the CPU 71 performs map matching processing using the current position of the associated vehicle detected in S1 and the navigation map data 53 stored in the map information DB 44 to specify an associated vehicle position on the map data.

Next, in S3, the CPU 71 determines whether a matching point has been extracted as a result of the map matching in S2. In other words, it is determined whether the associated vehicle is traveling along a road that is not included in the road network of the navigation map data 53 provided in the navigation device 4. If, as a result, it is determined that the associated vehicle is traveling along a road that is included in the road network of the navigation map data 53 (S3: NO), the method advances to S8.

On the other hand, when it is determined that the associated vehicle is traveling along a road that is not included in the road network of the navigation map data 53 (S3: YES), current positional coordinates detected by the GPS 61 are specified as a traveling locus start point S at which the vehicle begins to travel on a road that is not included in the road network of the navigation map data 53 from an existing road link included in the navigation map data 53. Further, on the basis of the current positional coordinates detected by the GPS 61 and the navigation map data 53, the road link of the traveling locus start point S is specified as a start link, and thus the start link number $L_S$ is obtained (S4).

Figure 8:
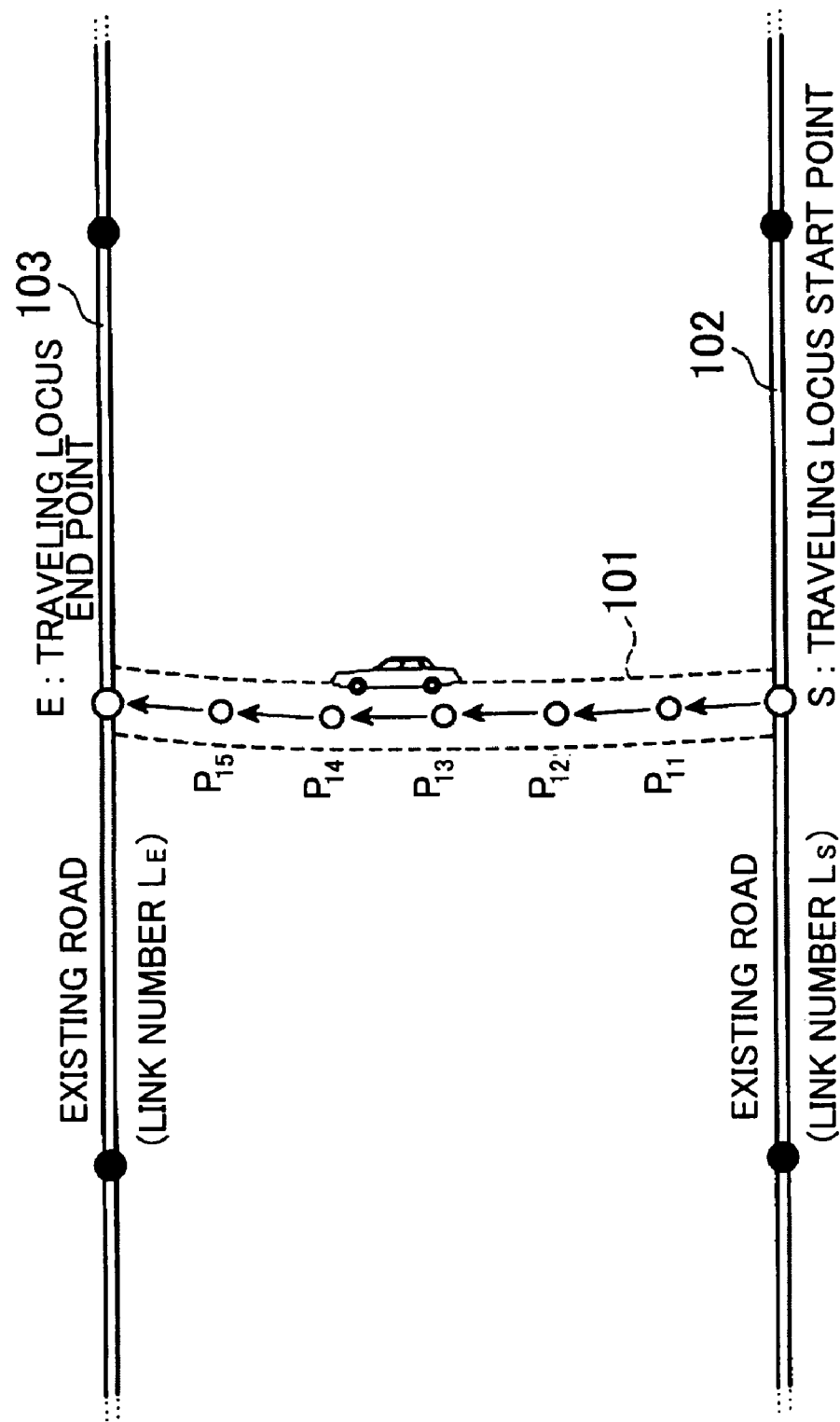
FIG. 8 is a view showing an example of the acquisition of traveling locus information when a vehicle travels along a road that is not included in a road network of navigation map data.

Next, in S5, the CPU 71 obtains various parameters serving as traveling locus information from the GPS 61 and various other sensors at predetermined time intervals (every one second, for example), and stores these parameters in the traveling locus information DB 42. FIG. 8 is a view showing an example of the acquisition of traveling locus information when the vehicle travels along a road 101 that is not included in the road network of the navigation map data 53.

That is, FIG. 8 shows an example in which the vehicle enters the road 101 from an existing road link 102, and then returns to an existing road link 103. When traveling is performed as shown in FIG. 8, the time t, positional coordinates P (x, y), advancement direction N and vehicle speed S are obtained from the GPS 61, gyro sensor 65 and vehicle speed sensor 50 at transit points $P_{11}$ to $P_{15}$ of a predetermined time interval (one second, for example). Further, when the ACC switch 51 detects that the engine of the associated vehicle has stopped or the shift lever sensor 52 detects that the shift lever has been set at "R," indicating that the vehicle is reversing, this information and the positional coordinates at this point are also stored as traveling locus information.

Next, in S6, the CPU 71 determines whether the vehicle has returned to an existing road included in the road network of the navigation map data 53 provided in the navigation device 4. If, as a result, it is determined that the vehicle has returned to a road included in the road network of the navigation map data 53 (S6: YES), the method advances to S7. On the other hand, when it is determined that the vehicle has not returned to a road included in the road network of the navigation map data 53 (S6: NO), the method returns to S5, where acquisition of the traveling locus information is continued.

In S7, the CPU 71 specifies the current positional coordinates detected by the GPS 61 as a traveling locus end point E at which the vehicle returns to an existing road link included in the navigation map data 53 from the road that is not included in the road network of the navigation map data 53. Further, on the basis of the current positional coordinates detected by the GPS 61 and the navigation map data 53, the road link of the traveling locus end point E is specified as an end link, and thus the end link number $L_E$ is obtained.

Next, in S8, the CPU 71 determines whether the timing for transmitting the traveling locus information obtained in S4 (see FIG. 3) to the map distribution center 2 as probe data has arrived. When it is determined that the transmission timing has arrived (S8: YES), the traveling locus information stored in the traveling locus information DB 42 is transmitted (S9). On the other hand, when it is determined that the transmission timing has not yet arrived (S8: NO), the traveling locus information is not transmitted, and the probe data gathering processing program is terminated.

On the map distribution side, first, in S101, the CPU 21 receives the traveling locus information transmitted from the navigation device 4. Next, in S102, the traveling locus information received in S101 is stored cumulatively in the traveling locus information DB 24 (see FIG. 3). Then, using the stored traveling locus information, new road information and differential update data are generated, for example, as will be described below.

Figure 9:
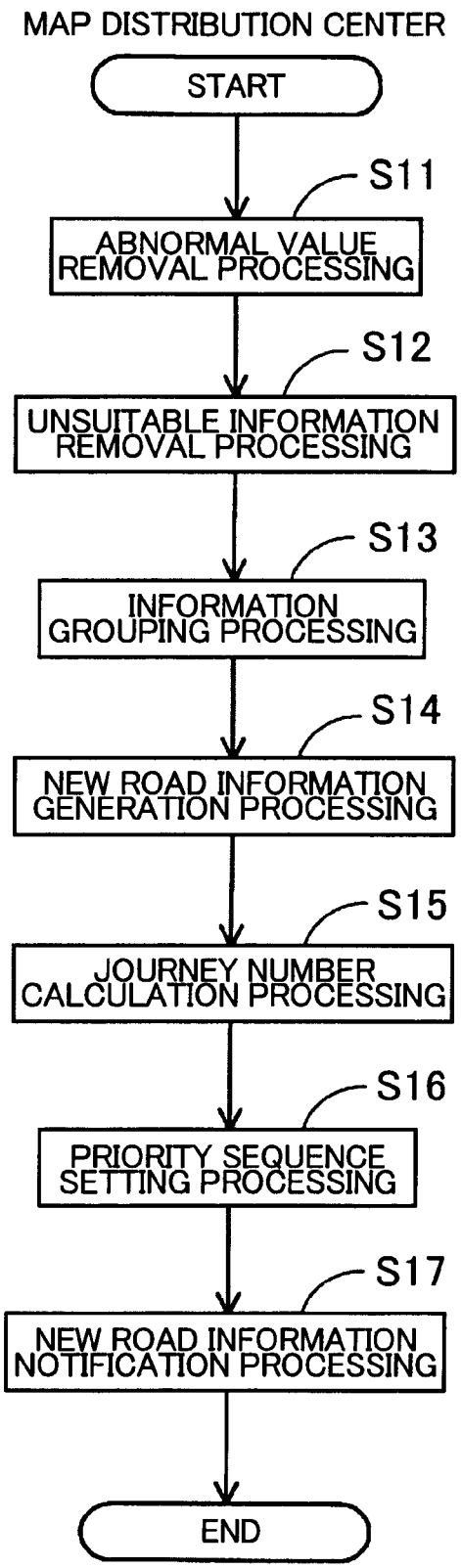
FIG. 9 is a flowchart of an exemplary new road information generation and notification method.

Next, an exemplary new road information generation and notification method will be described with reference to FIG. 9. The exemplary method may be implemented, for example, by one or more components of the above-described system 1. However, even though the exemplary structure of the above-described system may be referenced in the description, it should be appreciated that the structure is exemplary and the exemplary method need not be limited by any of the above-described exemplary structure. For example, the new road information generation and notification method may be implemented as a new road information generation and notification processing program executed by the server 20 of the map distribution center 2.

In the new road information generation and notification processing program, new road information is generated on the basis of the traveling locus information gathered by the map distribution center 2, for example, in the probe data gathering processing program described above (FIG. 7), and the map distribution center 2 side is notified of the generated new road information. Note that when the method is implemented as a program, the program may be stored in the RAM 22 or ROM 23 of the server 20, and executed by the CPU 21 at predetermined intervals (of 200 ms, for example).

First, in S11, the CPU 21 may remove detected abnormal values caused by device errors and so on from the traveling locus information newly gathered from each vehicle 3 and stored in the traveling locus information DB 24. Specifically, when one set of positional coordinates of the vehicle 3, which are supposed to be obtained continuously, is completely different to the other positional coordinates, data relating to these positional coordinates may be removed.

Next, in S12, the CPU 21 performs unsuitable information exclusion processing to exclude traveling locus information assumed to have been obtained when the vehicle 3 was not traveling along a new road from the newly gathered traveling locus information. The reason for this is that occasionally, even when the vehicle travels along a road that does not exist in the map data of the navigation device, the road may not correspond to a new road. For example, when the vehicle departs from a road and advances into a parking lot or facility and only the map matching results are referenced, it may be determined that the vehicle is traveling along a road that does not exist in the map data. As a result, new road information relating to a new road that does not exist may be generated erroneously. Hence, in this example, traveling locus information determined to satisfy any one of the following specific conditions (1) to (5) may be excluded:

(1) Traveling locus information relating to a traveling locus in which the vehicle returns along an identical link;
(2) Traveling locus information relating to a traveling locus in which the engine stops midway;
(3) Traveling locus information relating to a traveling locus in which the vehicle reverses midway;
(4) Traveling locus information relating to a traveling locus in which the distance between the traveling locus start point S and the traveling locus end point E is less than a predetermined distance (10 m, for example); and/or
(5) Traveling locus information relating to a traveling locus in which the vehicle travels on a road network included in the basic map data 30 of the map distribution center 2.

Figure 10:
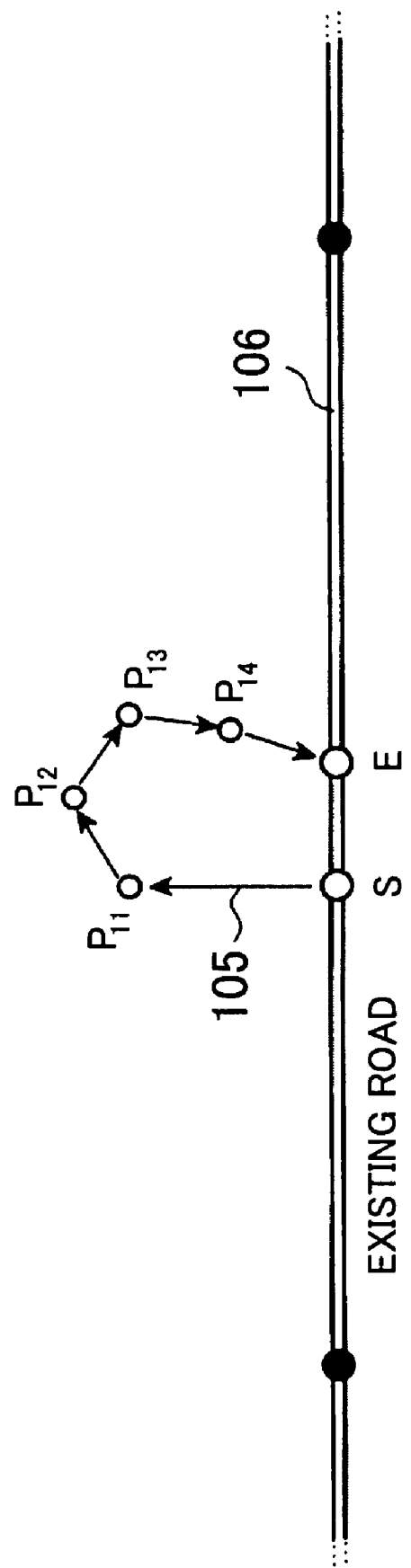
FIG. 10 is a view showing an example of traveling locus information excluded in step 12.

For example, FIG. 10 shows a traveling locus 105 of traveling locus information corresponding to condition (1). In the traveling locus 105 shown in FIG. 10, the vehicle passes through points $P_{11}$ to $P_{14}$ from an existing road link 106, and then returns to the same road link 106. In this type of traveling locus, it is highly likely that the vehicle has entered a parking lot or a large facility such as a shopping center, and highly unlikely that the vehicle is traveling along a new road. It is therefore determined that the traveling locus does not relate to a new road, and the corresponding traveling locus information may be excluded.

Figure 11:
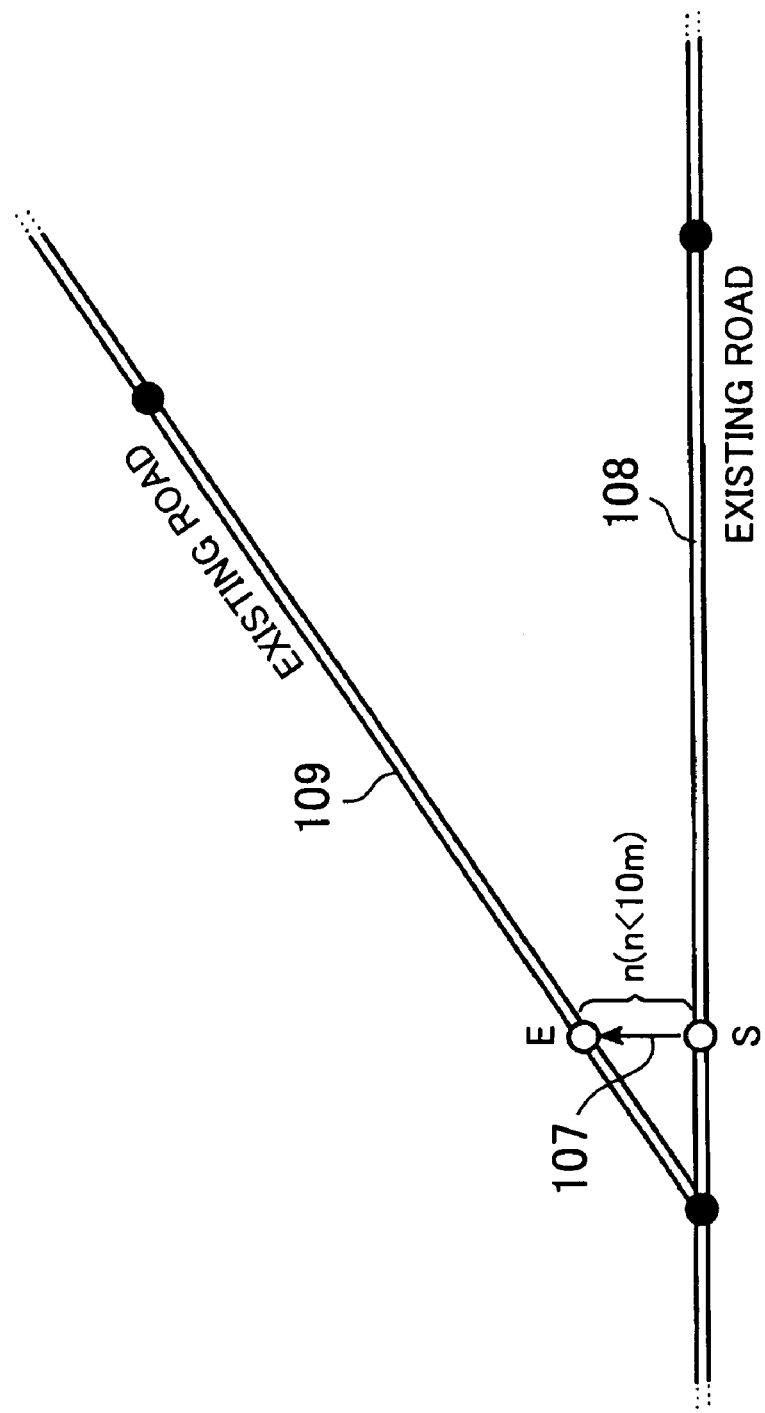
FIG. 11 is a view showing an example of traveling locus information excluded in step 12.

Further, FIG. 11 is a view showing a traveling locus 107 of traveling locus information corresponding to condition (4). In the traveling locus 107 shown in FIG. 11, the vehicle advances from a traveling locus start point S of an existing road link 108 to a traveling locus end point E of a road link 109, and a distance n from the traveling locus start point S to the traveling locus end point E is less than 10 m. In this type of traveling locus, it is highly likely that the vehicle has passed through a parking lot as a short cut, and highly unlikely that the vehicle is traveling along a new road. It is therefore determined that the traveling locus does not relate to a new road, and the corresponding traveling locus information may be excluded.

Similarly, in traveling loci of traveling locus information corresponding to conditions (2) and (3), it is highly likely that the vehicle has entered a parking lot or a large facility such as a shopping center, and highly unlikely that the vehicle is traveling along a new road. It is therefore determined that these traveling loci do not relate to a new road, and the corresponding traveling locus information may be excluded.

Further, in a traveling locus of traveling locus information corresponding to condition (5), the vehicle travels along a road that is understood by the map distribution center 2 to be an existing road. Hence, this type of traveling locus relates to a situation in which the vehicle travels along an existing road and the traveling locus information of the road is gathered erroneously due to a previous failure to update the map information of the navigation device 4 to a new version. Accordingly, it is determined that the traveling locus does not relate to a new road, and the corresponding traveling locus information is excluded. Note that in the unsuitable information exclusion processing of S12, traveling locus information determined to correspond to any one of conditions (1) through (5) may be excluded. Instead, traveling locus information determined to correspond to a plurality of the conditions (1) through (5) may be excluded.

Next, in S13, the CPU 21 performs information grouping processing for grouping the traveling locus information by classifying the newly gathered traveling locus information into groups of traveling locus information relating to the same road. Specifically, in this example, traveling locus information determined to correspond to both of the following conditions (1) and (2) may be grouped into the same group:

(1) Traveling locus information relating to traveling loci sharing a start link and an end link.
(2) Traveling locus information relating to traveling loci having a separation distance that is within a predetermined distance (30 m, for example).

Figure 12:
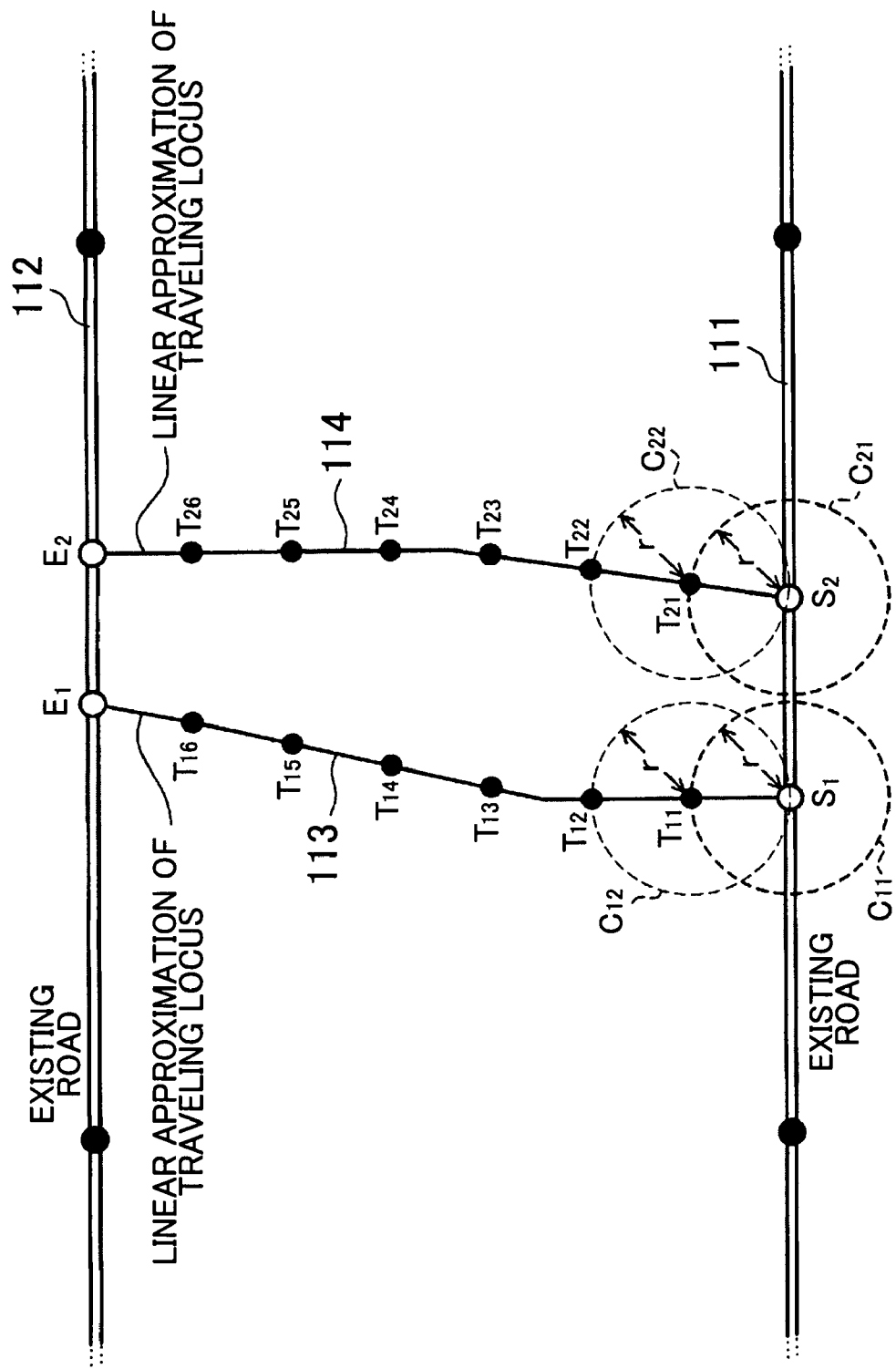
FIG. 12 is a view showing an example of traveling locus information grouped together in step 13.

Here, a specific example of a method for determining whether traveling locus information corresponds to condition (2) in particular will be described using FIG. 12. FIG. 12 shows two sets of traveling locus information. One of the sets of traveling locus information relates to a traveling locus in which the vehicle travels from a traveling locus start point $S_1$ on an existing road link 111 to a traveling locus end point $E_1$ on an existing road link 112. Note that a traveling locus line 113 is a linear approximation of the traveling locus of the traveling locus information, obtained from the coordinates of transit points of the vehicle.

The other set of traveling locus information likewise relates to a traveling locus in which the vehicle travels from a traveling locus start point $S_2$ on the existing road link 111 to a traveling locus end point $E_2$ on the existing road link 112. Note that a traveling locus line 114 is a linear approximation of the traveling locus of the traveling locus information, obtained from the coordinates of transit points of the vehicle.

In this example, when an average value of the separation distance between positional coordinates taken at predetermined distances from the traveling locus start points $S_1$, $S_2$ is within a predetermined distance (30 m, for example), condition (2) is considered satisfied.

Specifically, as shown in FIG. 12, a circle $C_{11}$ having a radius r may be drawn from the traveling locus start point S1 of the traveling locus line 113, and the coordinates of an intersection point $T_{11}$ between the circle $C_{11}$ and the traveling locus line 113 are calculated. Further, a circle $C_{21}$ having the radius r is drawn from the traveling locus start point $S_2$ of the traveling locus line 114, and the coordinates of an intersection point $T_{21}$ between the circle $C_{21}$ and the traveling locus line 114 are calculated.

Next, a circle $C_{12}$ having the radius r is drawn from the intersection point $T_{11}$ of the traveling locus line 113, and the coordinates of an intersection point $T_{12}$ between the circle $C_{12}$ and the traveling locus line 113 are calculated. Further, a circle $C_{22}$ having the radius r is drawn from the intersection point $T_{21}$ of the traveling locus line 114, and the coordinates of an intersection point $T_{22}$ between the circle $C_{22}$ and the traveling locus line 114 are calculated. Intersection points $T_{13}$ to $T_{16}$ and intersection points $T_{23}$ to $T_{26}$ are then calculated similarly. Then, the distance between the intersection points $T_{11}$ and $T_{21}$, the distance between the intersection points $T_{12}$ and $T_{22}$, the distance between the intersection points $T_{13}$ and $T_{23}$, the distance between the intersection points $T_{14}$ and $T_{24}$, the distance between the intersection points $T_{15}$ to $T_{25}$, and the distance between the intersection points $T_{16}$ and $T_{26}$ are calculated respectively, and when an average value thereof is within a predetermined distance (30 m, for example), the two sets of traveling locus information shown in FIG. 12 are determined to be traveling locus information relating to traveling loci having a separation distance within the predetermined distance (30 m, for example). Therefore, the two sets of traveling locus information are grouped into the same group.

Figure 13:
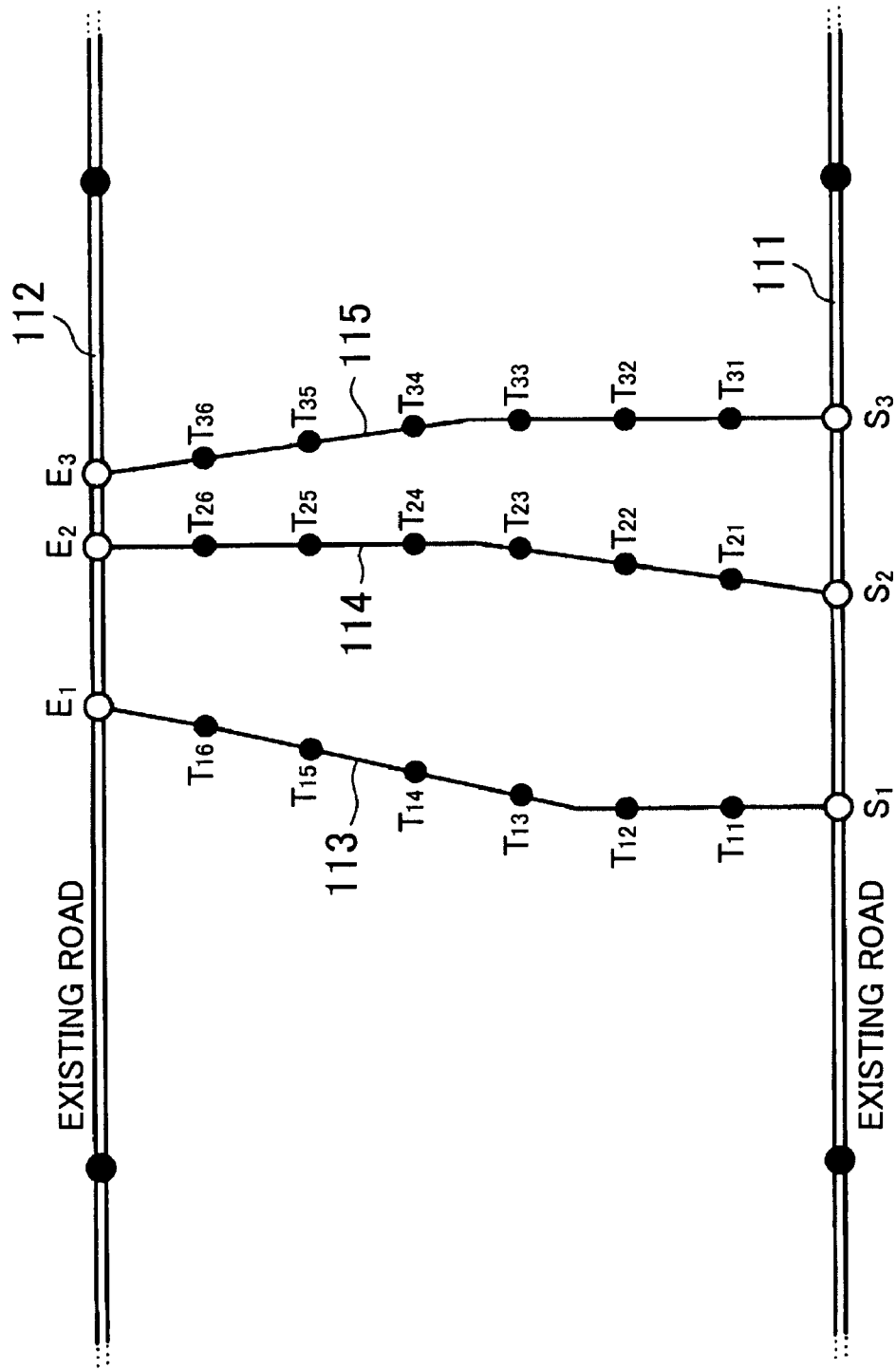
FIG. 13 is a view showing an example of traveling locus information grouped together in step 13.

When condition (2) is determined in relation to three or more sets of traveling locus information, as shown in FIG. 13, respective representative points are selected in relation to intersection points $T_{11}$ to $T_{1N}$, intersection points $T_{21}$ to $T_{2N}$, intersection points $T_{31}$ to $T_{3N}$, . . . , and when the average distance between the intersection points and the representative point is within the predetermined distance (30 m, for example), it is determined that the corresponding sets of traveling locus information relate to traveling loci having a separation distance within a predetermined distance (30 m, for example). Therefore, the sets of traveling locus information are grouped into the same group.

The determination may also be made using, for example, a standard deviation. In this case, traveling locus information in which the distance between the intersection point and the representative point is within an average value ±s is determined to relate to traveling loci having a separation distance within the predetermined distance, and therefore this information is grouped into the same group. In the information grouping processing of S13, traveling locus information determined to correspond to both condition (1) and condition (2) is grouped together; however, traveling locus information determined to correspond to either one of condition (1) and condition (2) may be grouped together.

Next, in S14, the CPU 21 performs new road information generation processing to generate new road information relating to a single new road specified from the traveling locus information belonging to each of the groups created in S13. Specifically, as shown in FIG. 4, the start link number $L_{AS}$, the end link number $L_{AE}$, and average positional coordinates $P_A$ (X, Y) at predetermined distance intervals (of 10 m, for example) from the start point of a traveling locus belonging to a group are calculated in relation to the grouped traveling locus information, and the new road information is generated using this combination. Note that when a plurality of groups exists, new road information is generated in an amount corresponding to the number of groups. However, new road information may not be generated again in relation to groups in which no newly gathered traveling locus information is grouped following the previous new road information generation processing.

Next, in S15, the CPU 21 calculates the number of times the vehicle has traveled along a new road corresponding to the new road information generated in S14. Specifically, the number of sets of traveling locus information belonging to the same group, which serves as a basis for the generated new road information, may be considered the number of times the vehicle has traveled along the new road.

Next, in S16, the CPU S21 sets a priority sequence for the new road information on the basis of the number calculated in S15. Specifically, the priority sequence is set such that new road information relating to a new road that has been traveled many times is given priority.

Figure 14:
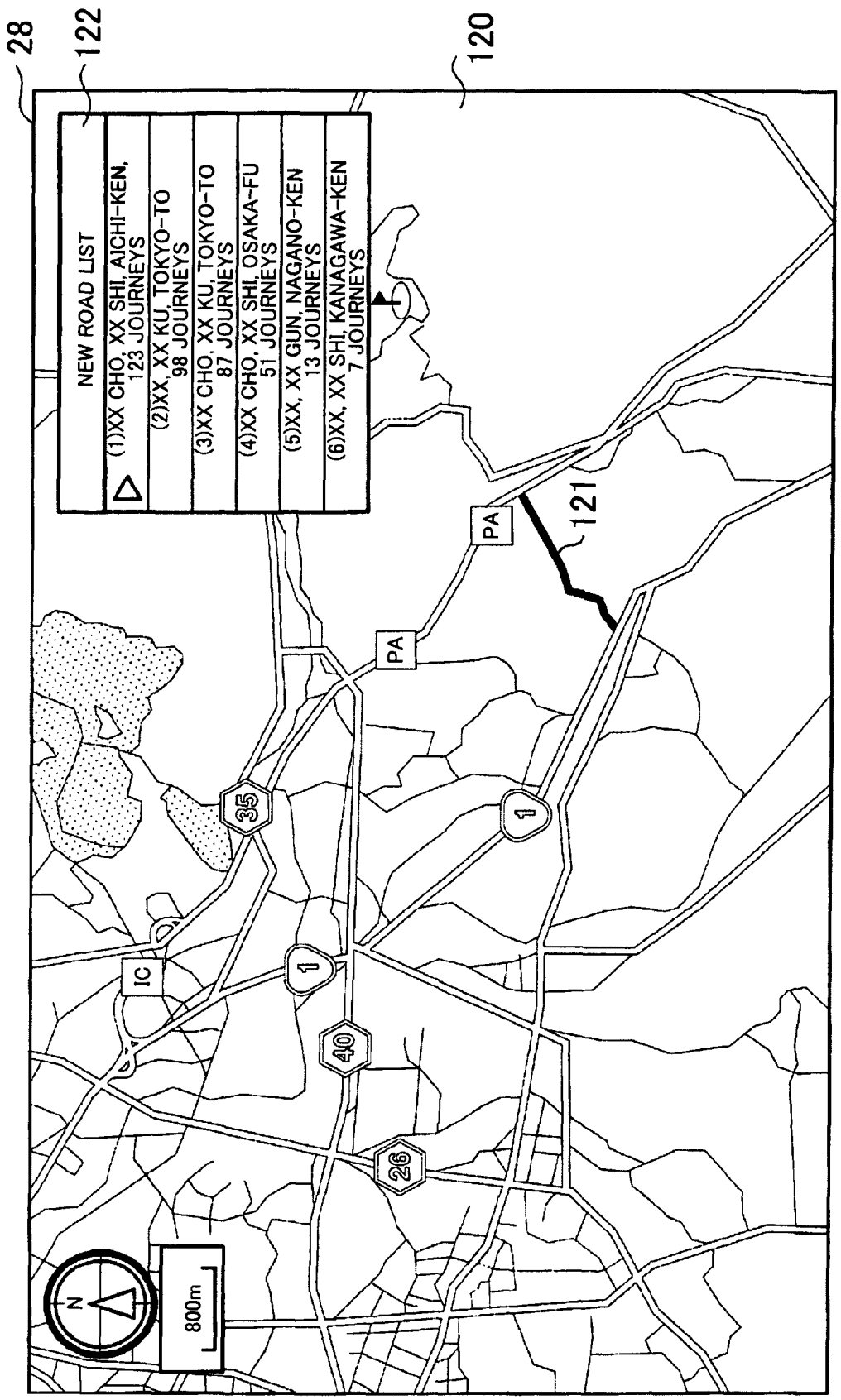
FIG. 14 is a view showing an exemplary display screen of a notification display for providing notification of the new road information.

Then, in S17, the map distribution center 2 side is notified of the new road information using the notification display 28 in accordance with the priority sequence set in S16. FIG. 14 is a view showing an exemplary display screen 120 of the notification display 28 for providing notification of the new road information.

As shown in FIG. 14, the display screen 120 is constituted by a peripheral map image including a new road 121, and a new road list 122. Here, in the new road list 122, addresses indicating the positions of new roads are listed in order of the set priority sequence. When a user selects a new road from the new road list 122, the selected new road and a peripheral map thereof is displayed on the notification display 28. In FIG. 14, for example, the new road having the highest priority on the new road list 122, which is located in "XX CHO, XX SHI, AICHI-KEN," is selected, and the corresponding new road 121 is displayed on the map. Thus, the new road information is notified in order of the priority sequence.

Next, an exemplary map data update method will be described with reference to FIG. 15. The exemplary method may be implemented, for example, by one or more components of the above-described system 1. However, even though the exemplary structure of the above-described system may be referenced in the description, it should be appreciated that the structure is exemplary and the exemplary method need not be limited by any of the above-described exemplary structure. For example, the map data update method may be implemented as a map data update program executed by the navigation ECU 45 of the vehicle 3 and the server 20 of the map distribution center 2

Here, in the map data update processing program, a specific area of the navigation map data 53 provided in the navigation device 4 is updated to a new version of the map data on the basis of differential update data newly distributed from the map distribution center 2. Note that, when the method is implemented as a program, the program may be stored in the RAM 72 or ROM 73 of the navigation device 4 or the RAM 22 or ROM 23 of the server 20, and executed by the CPU 71 or the CPU 21 at predetermined intervals (of 200 ms, for example).

First, on the navigation device side, in S21, the CPU 71 determines whether a map update start condition has been satisfied, or more specifically whether an accessory is ON, whether home registration (including modifications) has been performed on the operation unit 46, or whether a route search destination has been set using the operation unit 46. When it is determined that none of these conditions is satisfied (S21: NO), the processing program is terminated, and when it is determined that any one of the conditions is satisfied (S21: YES), the routine advances to S22.

In S22, the CPU 71 transmits navigation information for executing a map update to the map distribution center 2. Here, the information transmitted as the navigation information includes an ID for specifying the navigation device 4, coordinates of the registered home, and coordinates of the destination when a destination has been set.

Next, in S23, the CPU 71 receives the differential update data 31 transmitted from the map distribution center 2 via the communication module 5. Note that the received differential update data 31 includes version information for specifying the version of the differential update data 31. Next, in S24, differential update processing is performed on the navigation map data 53 stored in the map information DB 44 using the differential update data 31 received in S23. As a result, the navigation map data 53 are updated to new map data including newly constructed new roads.

On the map distribution center side, in S121, the CPU 21 receives navigation information for executing a map update from the navigation device 4. Here, the navigation information received from the navigation device 4 is transmitted when the power of the navigation device 4 is switched ON, when home registration is performed, and when a destination is set.

Next, in S122, the CPU 21 obtains the version of the navigation map data 53 currently stored in the map information DB 44 of the navigation device 4. Specifically, the CPU 21 references the version management DB 27 to specify the update subject navigation device 4 from the ID received as navigation information in S121, and extracts the version of the navigation map data 53 of the specified navigation device 4 from the version management DB 27 in each area.

Next, in S123, the CPU 21 compares the version of the map data currently provided in the navigation device 4 and the latest version of the map data possessed by the map distribution center 2 in the update subject area of the navigation device 4 from which the navigation information was transmitted, and determines whether an area to be updated exists (S124). Note that the update subject area may differ according to the conditions under which the navigation device 4 begins differential update processing of the map data, the position of the registered home, and the position of the set destination.

When it is determined that an area to be updated exists (S124: YES), all of the differential update data 31 required to update the area is extracted from the center side map information DB 26 (S125). The extracted differential update data 31 is then distributed to the navigation device 4 (S126). In this example, the differential update data may be distributed to the navigation device 4 in accordance with the priority sequence of the newly added new road information.

On the other hand, when it is determined that no area to be updated exists (S124: NO), the processing is terminated without transmitting the differential update data 31 to the navigation device 4.

As described in detail above, in the map information generating system 1 according to this example, traveling locus information generated when the vehicles 3, serving as probe cars, travel along roads that are not included in the navigation map data 53 of the navigation device 4 is transmitted to the map distribution center 2 as probe data (S7). Having received the traveling locus information from the navigation device 4 of each vehicle 3, the map distribution center 2 gathers together the received data. Next, the gathered data is refined by excluding traveling locus information assumed to have been obtained when the vehicle 3 was not traveling along a new road (S112). Traveling locus information relating to the same road is grouped together (S13). Next, new road information relating to a single new road is generated in each group (S14). Thus, when generating new road information from the traveling locus of a vehicle, traveling loci obtained when the vehicle 3 was not actually traveling along a new road can be excluded accurately, and a situation in which plural new road information is generated in relation to the same road can be prevented. Accordingly, the new road information can be generated quickly and accurately.

Further, when the road link of the traveling locus start point S and the road link of the traveling locus end point E in the traveling locus information are identical, it may be assumed that the vehicle is not traveling along a new road, and the traveling locus information is excluded. Thus, a situation in which new road information is generated on the basis of a traveling locus generated when the vehicle travels into a parking lot or a large facility such as a shopping center can be prevented. Furthermore, traveling locus information in which the road link of the traveling locus start point S and the road link of the traveling locus end point E are identical is grouped together, and therefore traveling loci relating to the same road can be compartmentalized accurately on the basis of link connections.

Further, traveling locus information generated when the engine of the vehicle 3 is switched off during traveling, traveling locus information generated when the vehicle reverses during traveling, and traveling locus information in which the traveling locus start point S and the traveling locus end point E are within a predetermined distance of each other are assumed to have been obtained when the vehicle 3 was not traveling along a new road, and therefore this traveling locus information is excluded. Hence, situations in which new road information is generated on the basis of a traveling locus generated when the vehicle travels into a parking lot or a large facility such as a shopping center, a traveling locus generated when the vehicle passes through a parking lot as a shortcut, and so on can be prevented.

Furthermore, an average value of a separation distance between positional coordinates is calculated at predetermined distance intervals in relation to a plurality of traveling loci of the gathered traveling locus information, and traveling locus information relating to traveling loci in which the calculated average value of the separation distance is within a predetermined distance is grouped together. Thus, when the new road information is generated from the traveling loci of the vehicles, traveling loci relating to the same road can be compartmentalized accurately on the basis of the disposition of the traveling loci.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, the above-described navigation device 4 records the traveling locus information of the vehicle 3 (S5) and specifies the start link and the end link (S4, S7), while the map distribution center 2 gathers the traveling locus information from each vehicle 3 (S102), excludes unsuitable data (S11, S12), groups together the information (S13), generates the new road information (S14), and sets the priority sequence (S16). However, any of the aforementioned steps may be performed by either the navigation device 4 or the map distribution center 2.

For example, the navigation device 4 may record the traveling locus information of the vehicle 3 (S5), specify the start link and the end link (S4, S7), and exclude unsuitable data (S11, S12), while the map distribution center 2 may gather the traveling locus information, from which the unsuitable data have been deleted, from each vehicle 3 (S102), group together the information (S13), generate the new road information (S14), and set the priority sequence (S16).

Also, for example, the navigation device 4 may perform all of recording the traveling locus information of the vehicle 3 (S5), specifying the start link and the end link (S4, S7), excluding unsuitable data (S11, S12), grouping together the information (S13), generating the new road information (S14), and setting the priority sequence (S16). In this case, the new road information cannot be generated in consideration of the traveling loci of other vehicles, but the map distribution center 2 does not need to be employed to generate the new road information. Hence, the navigation map data 53 can be updated without the need to perform an actual inspection of the new roads on the map distribution center 2 side. As a result, communication costs can be reduced, and the map data can be updated more quickly.

In another example, the navigation device 4 may only record the traveling locus information of the vehicle 3 (S5), and the map distribution center 2 may gather the traveling locus information from each vehicle 3 (S102), specify the start link and the end link (S4, S7), exclude unsuitable data (S11, S12), group together the information (S13), generate the new road information (S14), and set the priority sequence (S16).

Also, in the above examples, the new road information is notified and distributed in accordance with the set priority sequence, but updating of the navigation map data 53 may also be performed in accordance with a priority sequence. For example, differential update data including new road information having a high priority may be updated preferentially.

In the above examples, the generated new road information may be notified on the notification display 28 of the map distribution center 2. However, notification may be performed on a PC belonging to the user of the navigation device 4. Specifically, after setting the priority sequence in S16 of FIG. 9, the new road information is distributed to the PC of the user such that the user can read the new road information via the PC. Note that when the new road information is distributed to the PC of the user, distribution is preferably performed in order from the new road information having the highest priority.

What is claimed is:

1. A map information generating system, comprising:
 a memory that stores map information including a road network; and
 a controller that:
  gathers traveling information including a plurality of loci, each locus representing a vehicle traveling along a road that is not included in the stored road network;
  separates the loci within the gathered traveling information into groups, each group related to a same road, the loci being separated into the groups by the controller:
   determining positional coordinates at predetermined distance intervals along each locus within the gathered traveling information;
   calculating an average separation distance between respective positional coordinates as a separation distance between each locus in the gathered traveling information; and
   grouping together the loci in the gathered traveling information in which the calculated separation distance is within a predetermined distance; and
  generates new road information relating to a single new road for each group of loci.

2. The map information generating system according to claim 1, wherein, for each locus within the gathered traveling information, the controller:
 specifies a starting road link included in the stored road network at which the vehicle starts to travel along the road not included in the stored road network;
 specifies an ending road link included in the stored road network at which the vehicle returns from the road that is not included in the stored road network; and
 groups together the loci within the gathered traveling information in which the starting road links are identical and the ending road links are identical.

3. The map information generating system according to claim 1, wherein the controller:
 excludes loci assumed to have been obtained when the vehicle was not traveling along a new road from the groups of loci.

4. The map information generating system according to claim 3, wherein the controller:
 specifies a starting road link included in the stored road network at which the vehicle starts to travel along the road not included in the stored road network;
 specifies an ending road link included in the stored road network at which the vehicle returns from the road that is not included in the stored road network; and
 excludes each locus in which the starting road link and the ending road link are identical from the groups of loci.

5. The map information generating system according to claim 3, wherein the controller:
 determines, for each locus, whether an engine of the vehicle was switched OFF while traveling along the locus; and
 excludes each locus in which the engine was switched OFF during travel along the locus from the groups of loci.

6. The map information generating system according to claim 3, wherein the controller:
 determines, for each locus, whether the vehicle reversed while traveling along the locus; and excludes each locus in which the vehicle reversed during travel from the groups of loci.

7. The map information generating system according to claim 3, wherein the controller:
specifies a starting point included in the stored map information at which the vehicle starts to travel along the road not included in the road network;
specifies an ending point included in the stored map information at which the vehicle returns from the road that is not included in the road network of the map information; and
excludes each locus in which the starting point and the ending point are within a predetermined distance of each other.

8. A map information generating method, comprising:
storing map information including a road network;
gathering traveling information including a plurality of loci, each locus representing a vehicle traveling along a road that is not included in the stored road network;
separating the loci within the gathered traveling information into groups, each group related to a same road, the loci being separated into the groups by:
determining positional coordinates at predetermined distance intervals along each locus within the gathered traveling information;
calculating an average separation distance between respective positional coordinates as a separation distance between each locus in the gathered traveling information; and
grouping together the loci in the gathered traveling information in which the calculated separation distance is within a predetermined distance; and
generating new road information relating to a single new road for each group of loci.

9. The map information generating method according to claim 8, further comprising, for each locus within the gathered traveling information:
specifying a starting road link included in the stored road network at which the vehicle starts to travel along the road not included in the stored road network;
specifying an ending road link included in the stored road network at which the vehicle returns from the road that is not included in the stored road network; and
grouping together the loci within the gathered traveling information in which the starting road links are identical and the ending road links are identical.

10. The map information generating method according to claim 8, further comprising:
excluding loci assumed to have been obtained when the vehicle was not traveling along a new road from the groups of loci.

11. The map information generating method according to claim 10, further comprising:
specifying a starting road link included in the stored road network at which the vehicle starts to travel along the road not included in the stored road network;
specifying an ending road link included in the stored road network at which the vehicle returns from the road that is not included in the stored road network of the map information; and
excluding each locus in which the starting road link and the ending road link are identical from the groups of loci.

12. The map information generating method according to claim 10, further comprising:
determining, for each locus, whether an engine of the vehicle was switched OFF while traveling along the locus; and
excluding each locus in which the engine was switched OFF during travel along the locus from the groups of loci.

13. The map information generating method according to claim 10, further comprising:
determining, for each locus, whether the vehicle reversed while traveling along the locus; and
excluding each locus in which the vehicle reversed during travel from the groups of loci.

14. The map information generating method according to claim 10, further comprising:
specifying a starting point included in the stored road network at which the vehicle starts to travel along the road not included in the stored road network;
specifying an ending point included in the stored road network at which the vehicle returns from the road that is not included in the stored road network of the map information; and
excluding each locus in which the starting point and the ending point are within a predetermined distance of each other.

15. A computer-readable storage medium storing a computer program usable to generate map information, the computer program comprising:
instructions for gathering traveling information including a plurality of loci, each locus representing a vehicle traveling along a road that is not included in a stored road network;
instructions for separating the loci within the gathered traveling information into groups, each group related to a same road, the loci being separated into the groups by:
instructions for determining positional coordinates at predetermined distance intervals along each locus within the gathered traveling information;
instructions for calculating an average separation distance between respective positional coordinates as a separation distance between each locus in the gathered traveling information; and
instructions for grouping together the loci in the gathered traveling information in which the calculated separation distance is within a predetermined distance; and
instructions for generating new road information relating to a single new road for each group of loci.

* * * * *